(12) United States Patent
Uchida et al.

(10) Patent No.: US 7,720,080 B2
(45) Date of Patent: May 18, 2010

(54) RELAY UNIT, TERMINAL DEVICE, COMMUNICATION SYSTEM, AND COMMUNICATION CONTROL METHOD

(75) Inventors: Yoshitaka Uchida, Yokosuka (JP); Norihiro Ishikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 943 days.

(21) Appl. No.: 11/349,230

(22) Filed: Feb. 8, 2006

(65) Prior Publication Data

US 2006/0209855 A1 Sep. 21, 2006

(30) Foreign Application Priority Data

Feb. 9, 2005 (JP) .......................... P2005-033382

(51) Int. Cl.
*H04L 12/28* (2006.01)
(52) U.S. Cl. ...................... 370/401; 370/402; 370/404; 709/228; 709/238
(58) Field of Classification Search ................. 370/401, 370/389, 392, 252, 395.53, 395.5, 465, 466, 370/402, 404, 475; 709/223, 228, 238, 242, 709/244
See application file for complete search history.

(56) References Cited

U.S. PATENT DOCUMENTS

| | | | | |
|---|---|---|---|---|
| 7,061,911 B2 * | 6/2006 | Furuno | ........................ | 370/392 |
| 7,356,045 B2 * | 4/2008 | Satapati et al. | .............. | 370/466 |
| 2002/0023152 A1 * | 2/2002 | Oguchi | ........................ | 709/223 |
| 2003/0212771 A1 * | 11/2003 | Kwon et al. | ................. | 709/220 |
| 2004/0003099 A1 * | 1/2004 | House et al. | ................. | 709/229 |
| 2004/0047349 A1 * | 3/2004 | Fujita et al. | .................. | 370/389 |

FOREIGN PATENT DOCUMENTS

JP 2000-315200 11/2000

(Continued)

OTHER PUBLICATIONS

P. Srisuresh, et al., RFC 3022—Traditional IP Network Translator (Traditional NAT), IETF, XP-002227044, Jan. 2001, pp. 1-16.

(Continued)

*Primary Examiner*—Pankaj Kumar
*Assistant Examiner*—Anez Ebrahim
(74) *Attorney, Agent, or Firm*—Oblon, Spivak, McClelland, Maier & Neustadt, L.L.P.

(57) ABSTRACT

A relay unit capable of inquiring of a DNS comprises: an inquiry section which transfers an acquisition request of a transmission destination terminal address, sent from a transmission source terminal, to the DNS, and acquires the transmission destination terminal address and a transmission destination label corresponding to the transmission destination terminal address and transmission destination terminal; a label creation section which creates a unique relay label; a label storage section which correlates the created relay label to the acquired transmission destination terminal address and transmission destination label, and stores thus obtained label; a label transmission section which transmits the relay label and a private address of the relay unit to the transmission source terminal; and a determination section which, if a packet containing the relay label is received from the transmission source terminal, determines that the transmission destination terminal address and transmission destination label corresponding to the relay label are an address and a label related to a transmission destination or a relay destination of the packet.

2 Claims, 7 Drawing Sheets

FOREIGN PATENT DOCUMENTS

| | | |
|---|---|---|
| JP | 2001/202317 | 7/2001 |
| JP | 2002-204252 | 7/2002 |
| JP | 2004-40474 | 2/2004 |
| JP | 2005-12352 | 1/2005 |
| WO | WO 2004/093394 A1 | 10/2004 |

OTHER PUBLICATIONS

Uchida, Yoshitaka et al., "Virtual IP Layer: An Architecture for Virtual Extending IP Connectivity," DICOMO, 2005, pp. 365-368 (with English translation).

* cited by examiner

RELAY UNIT, TERMINAL DEVICE, COMMUNICATION SYSTEM, AND COMMUNICATION CONTROL METHOD

BACKGROUND OF THE INVENTION

1. Field of the Invention

The present invention relates to a relay unit capable of inquiring of a name resolution system, a terminal device, a communication system comprising the relay unit and the terminal device, and a communication control method. It should be noted in the present specification that a private IP address is referred to as "private address," and a global IP address as "global address."

2. Related Background Art

First of all, the communication system in which the relay unit (also called "router" hereinafter) is used and an address conversion method are described. A bridge between a global address space and a private address space is served via the router. Further, address conversion (in other words, conversion between a global address and a private address) is performed in the router by means of a NAT method, NAPT method, and IP masquerading method, thereby enabling communications.

It should be noted that a packet in the Internet cannot be used if either a transmission source address or a transmission destination address is not a global address, and a private address is limited in the scope of its use to the inside of a private network by a router.

A router holds, in a table, information for determining a router to which a packet is to be transferred next in accordance with a transmission destination of the packet. When a communication is made from a terminal device present in a private network to a terminal device present in a global network, the transmission source address of the packet sent to the router is converted into a global address that the router has, and a router for transferring the packet routing is determined in reference to the table, the router performing routing.

It should be noted that the address conversion methods described below are used in address conversion.

The NAT method is for converting a private address of a transmission source into a global address that the router has, and sending the converted address to a global network. Also, the information in which the private address is related to the global address of the router is held in the table, the global address of a transmission destination header is converted with a private address with respect to a packet which is sent from a terminal device of the global network to a terminal device of a private network, and the converted address is sent to the terminal device. In this method, the router has to hold the same number of global addresses as the total number of terminals which are connected to the global network simultaneously.

The NAPT method has a function for automatically converting a port number in addition to the function of the NAT method. With the port number being used for conversion, the use is allowed in a single global address of the router, even if a plurality of terminals exist in a private network. Furthermore, a table in which the terminals in the private network are related to the port numbers is held. However, the use may not be allowed in an application using a specific port number.

The IP masquerading method is a term used in Linux and has the same function as the NAPT method.

It should be noted that these systems may not be distinguished from one another and can also be broadly called "NAT."

Incidentally, there is MPLS (Multi-Protocol Label Switching) as a communication system where labels are used (See Japanese Patent Application Laid-Open No. 2005-12352). This system is described simply hereinafter.

While a general router uses a transmission destination address of a packet in routing, the MPLS uses a label instead of an address. When a packet is sent to each of routers (LER: Label Edge Router) located at end points in a network which is configured with routers (LSR: Label Switching Router) having the MPLS function, a label is added to the packet, and this packet is transferred to the next LSR. Further, the LSR which received the packet performs routing based on the label and transfers the packet. When transferring the packet to a network outside the network configured with LSRs, LERs remove the packet and then transfer it.

SUMMARY OF THE INVENTION

In the conventional methods described above, a private address, which is not a shared address such as a global address, is unique in the same space, thus there were problems that the terminal devices inside the shared address space are restricted in communications using a private address, and that communication between the terminals of the private address space via the shared addresses cannot be used.

An object of the present invention, therefore, is to provide a relay unit which is capable of smoothly carrying out packet communication between different address spaces, a terminal device, a communication system, and a communication control method.

In order to achieve the above object, the relay unit according to the present invention is a relay unit capable of inquiring of a name resolution system, the relay unit being characterized in comprising: an inquiry section which transfers an acquisition request, which is sent from a transmission source terminal belonging to a certain address space and is related to an address of a transmission destination terminal belonging to an address space different from the certain address space, to the name resolution system, and acquires the address of the transmission destination terminal and a transmission destination label corresponding to the transmission destination terminal from the name resolution system; a label creation section which creates a unique relay label; a label storage section which correlates the relay label, which is created by the label creation section, with the transmission destination terminal address and transmission destination label acquired by the inquiry section, and stores thus obtained label; a label transmission section which transmits the relay label and the address of the relay unit to the transmission source terminal; and a determination section which, if a packet containing the relay label transmitted from the label transmission section is received from the transmission source terminal, determines that the transmission destination terminal address and transmission destination label, which are caused to correlate with the relay label and stored by the label storage section, are an address and a label related to a transmission destination or a relay destination of the packet.

Furthermore, it is desired that the relay unit further comprise a packet transfer section which transfers the received packet to the transmission destination or the relay destination by using the address and label of the transmission destination or relay destination, which are determined by the determination section, as information of a transmission destination, and using the relay label and the address of the relay unit as information of a transmission source.

In order to achieve the above-described object, the communication system according to the present invention is a communication system comprising a relay unit capable of inquiring of a name resolution system and a terminal device, the communication system being characterized in that the terminal device comprises: an acquisition request transmission section which, as a transmission source terminal belonging to a certain address space, transmits an acquisition request, which is related to an address of a transmission destination terminal belonging to an address space different from the certain address space, to the name resolution system; and a packet transmission section which, if a relay label and the address of the relay unit are received from the relay unit in response to the acquisition request transmitted from the acquisition request transmission section, transmits a packet containing the relay label to the address of the relay unit, and that the relay unit comprises: an inquiry section which transfers the acquisition request sent from the acquisition request transmission section to the name resolution system, and acquires the transmission destination terminal address and a transmission destination label corresponding to the transmission destination terminal from the name resolution system; a label creation section which creates a unique relay label; a label storage section which correlates the relay label, which is created by the label creation section, with the transmission destination terminal address and transmission destination label acquired by the inquiry section, and stores thus obtained label; a label transmission section which transmits the relay label and the address of the relay unit to the terminal device; and a determination section which, if a packet containing the relay label transmitted from the label transmission section is received from the terminal device, determines that the transmission destination terminal address and transmission destination label, which are caused to correlate with the relay label and stored by the label storage section, are an address and a label related to a transmission destination or a relay destination of the packet.

In the above-described invention, when the relay unit receives, from the transmission source terminal belonging to a certain address space, the acquisition request related to the address of the transmission destination terminal belonging to an address space different from the certain address space, the inquiry section transfers the acquisition request to the name resolution system, and acquires the transmission destination terminal address and the transmission destination label corresponding to the transmission destination terminal from the name resolution system. The label creation section then creates a unique relay label, and the label storage section correlates the created relay label with the transmission destination terminal address and transmission destination label acquired by the inquiry section, and stores them. At the same time the label transmission section transmits the relay label and the address of the relay unit to a transmission source terminal. In response to this, if a packet containing the relay label is received from the transmission source terminal, the determination section determines that the transmission destination terminal address and transmission destination label, which are related to the relay label and stored, are an address and a label related to a transmission destination or a relay destination of the packet.

As described above, even when carrying out packet communication between different address spaces, the load in address conversion can be avoided by using the labels, and the packet communication can be smoothly carried out between different address spaces. Moreover, the present invention can be applied not only to communications in which address conversion is performed by means of the NAT method, NAPT method, IP masquerading method or the like, but also to multicast communication by relating one label to a plurality of addresses. The present invention can also be applied to communication between an IPv4 network and an IPv6 network and mobility communication in which a movement of the terminal device is assumed.

Figure 2:
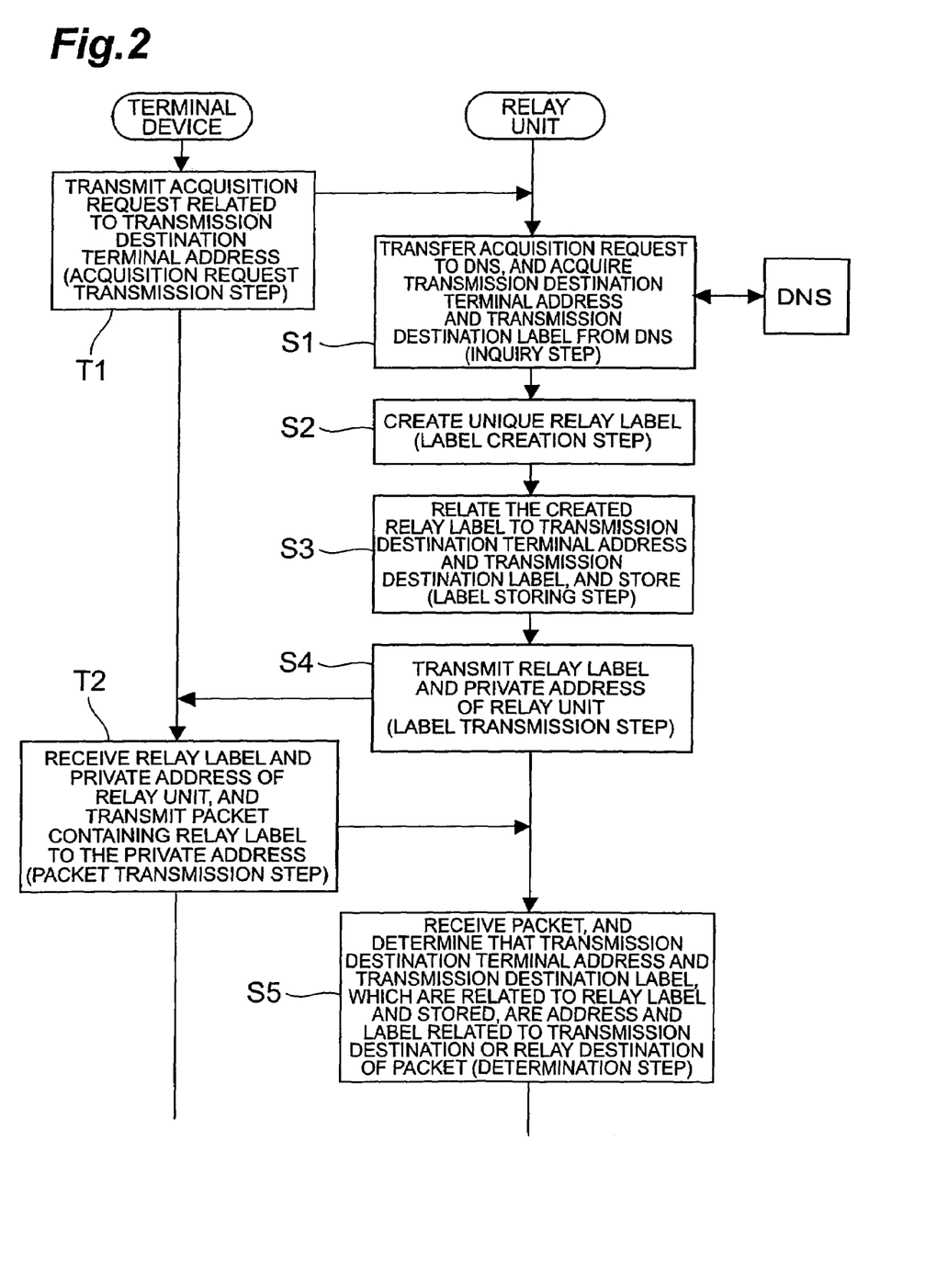
FIG. 2 is a flow chart showing a basic part of the communication control method.

It should be noted that the present invention can be viewed as an invention related to a communication control method in the relay unit and a communication control method in the communication system, and can be described as shown in the flow chart of FIG. 2. These methods are described hereinafter.

A communication control method in the relay unit according to the present invention is a communication control method in the relay unit which is capable of inquiring of a name resolution system, the communication control method being characterized in comprising: an inquiry step (S1 in FIG. 2) of transferring an acquisition request, which is sent from a transmission source terminal belonging to a certain address space and is related to an address of a transmission destination terminal belonging to an address space different from the certain address space, to the name resolution system, and acquiring the transmission destination terminal address and a transmission destination label corresponding to the transmission destination terminal from the name resolution system; a label creation step (S2) of creating a unique relay label; a label storing step (S3) of correlating the relay label, which is created in the label creation step, with the transmission destination terminal address and transmission destination label acquired in the inquiry step, and storing thus obtained label; a label transmission step (S4) of transmitting the relay label and the address of the relay unit to the transmission source terminal; and a determination step (S5) of, if a packet containing the relay label transmitted in the label transmission step is received from the transmission source terminal, determining that the transmission destination terminal address and transmission destination label, which are caused to correlate with the relay label and stored in the label storing step, are an address and a label related to a transmission destination or a relay destination of the packet.

Further, the communication control method in the communication system according to the present invention is a communication control method in the communication system which comprises a relay unit capable of inquiring of a name resolution system and a terminal device, the communication control method being characterized in comprising: an acquisition request transmission step (T1 in FIG. 2) in which, the terminal device, as a transmission source terminal belonging to a certain address space, transmits an acquisition request, which is related to an address of a transmission destination terminal belonging to an address space different from the certain address space, to the name resolution system; an inquiry step (S1) in which the relay unit receives the acquisition request, transfers the received acquisition request to the name resolution system, and acquires the transmission destination terminal address and a transmission destination label corresponding to the transmission destination terminal from the name resolution system; a label creation step (S2) in which the relay unit creates a unique relay label; a label storing step (S3) in which the relay unit relates the relay label, which is created in the label creation step, to the transmission destination terminal address and transmission destination label acquired in the inquiry step, and stores thus obtained label; a label transmission step (S4) in which the relay unit transmits the relay label and the address of the relay unit to the terminal device; a packet transmission step (T2) in which the terminal device receives the relay label and the address of the relay unit from the relay unit, and transmits a packet containing the relay label to the address of the relay unit; and a determination step (S5) in which the relay unit receives the packet containing the relay label from the terminal device, and determines that the transmission destination terminal address and transmission destination label, which are caused to correlate with the relay label and stored in the label storing step, are an address and a label related to a transmission destination or a relay destination of the packet.

Incidentally, the present invention has an excellent characteristic in creation of a response packet in the transmission destination terminal and transfer of the response packet. The terminal device according to the present invention comprises: a response packet creation section which, if the address of the relay unit is set as an address of a transmission destination, and if a packet with a packet header containing the transmission destination address, a transmission destination label, a transmission source address, and a transmission source label is received from the relay unit, switches between the transmission destination address and the transmission source address, and switches between the transmission destination label and the transmission source label, thereby creating a response packet; and a packet transmission section which transmits the created response packet to the relay unit.

Furthermore, the relay unit of the present invention comprises a header rewriting section which, if a response packet with a packet header containing a transmission destination address, a transmission destination label, a transmission source address, and a transmission source label is received, acquires an address and label corresponding to, among the relay labels stored in the label storage section, a relay label matching the transmission destination label, sets the acquired address and label as the transmission destination address and the transmission destination label, and sets the address of the relay unit and the transmission destination label of the response packet as the transmission source address and the transmission source label, thereby rewriting the packet header of the response packet.

By the above configuration, the response packet is created in the transmission destination terminal, and, by rewriting the header of the response packet in the relay unit, the response packet is caused to pass, in the opposite direction, through a route where the response packet is transmitted from the transmission source terminal to the transmission destination terminal, and returned to the transmission source terminal. Specifically, the present invention has the characteristics that it can create a response packet, easily perform an operation of transferring it to the transmission source terminal, and realize a TCP communication.

When one or more address spaces lie between the address space of the transmission source terminal and the address space of the transmission destination terminal, rewriting of the packet header needs to be performed in the relay unit that relays the packet. Therefore, the relay unit of the present invention is desired to have the following configuration. Specifically, the relay unit of the present invention is desired to be configured such that, if a packet with a packet header containing a transmission destination address, a transmission destination label, a transmission source address, and a transmission source label is received from other relay unit, the label creation section creates a unique relay label dynamically, the label storage section correlates the created relay label with the transmission source address and transmission source label of the received packet and stores thus obtained label, the header rewriting section acquires an address and label corresponding to a relay label matching the transmission destination label of the received packet among the relay labels stored in the label storage section, sets the acquired address and label as the transmission destination address and the transmission destination label, and sets the address of the relay unit and the created relay label as the transmission source address and the transmission source label, thereby rewriting the packet header of the received packet.

As described above, according to the present invention, even when carrying out communication between different address spaces, the load in address conversion can be avoided by using the labels, and the packet communication can be smoothly carried out between different address spaces.

DESCRIPTION OF THE PREFERRED EMBODIMENTS

Configuration of the Communication System

Figure 1:
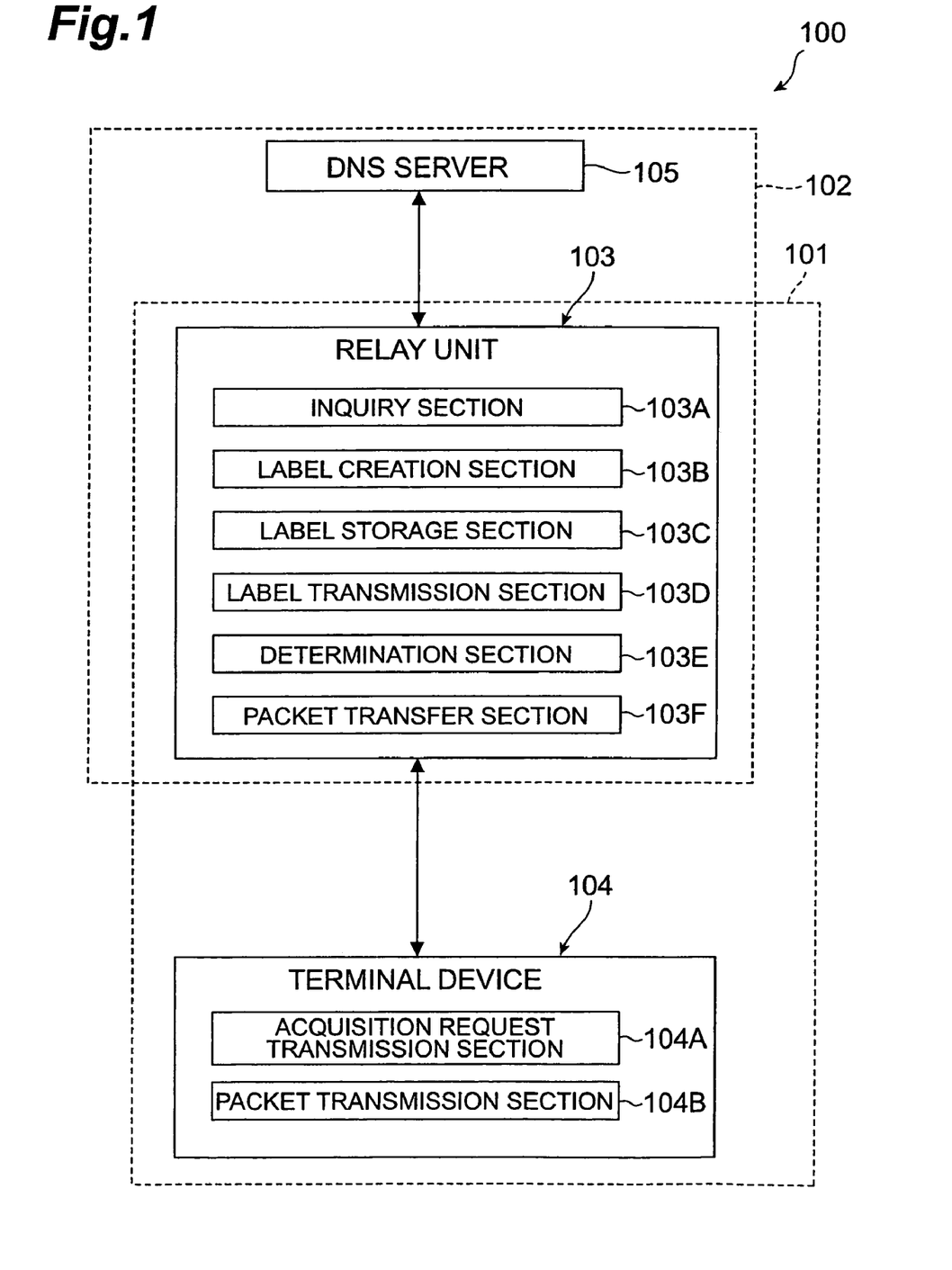
FIG. 1 is a functional block diagram showing a schematic configuration of the communication system.

FIG. 1 shows a basic configuration of the communication system 100 related to an embodiment of the present invention. As shown in FIG. 1, the communication system 100 is configured such that a private address space 101 is connected to a global address space 102 via a relay unit 103, a terminal device 104 is present in the private address space 101, and the global address space 102 is provided with a DNS server 105 as a name resolution system. Here, when the terminal device 104 is taken as a transmission source terminal, a transmission destination terminal may be present in the same global address space as a relay unit 302 as in a transmission destination terminal 305 shown in FIG. 5, or may be present in an address space different from that of a relay unit 405, as in a transmission destination terminal 404 shown in FIG. 6, whereby communication is carried out via a route which passes through one or more relay units.

The terminal device 104 has a function as a regular communication terminal. Particularly, as a configuration related to the present invention, the terminal device 104 comprises an acquisition request transmission section 104A which transmits an acquisition request related to a transmission destination terminal address to the DNS server 105, and a packet transmission section 104B which, if a relay label and a private address of the relay unit 103 are received from the relay unit 103 in response to the acquisition request, transmits a packet containing the relay label to the private address of the relay unit 103.

The relay unit 103 has a function as a regular relay terminal. Particularly, as a configuration related to the present invention, the relay unit 103 comprises an inquiry section 103A, a label creation section 103B, a label storage section 103C, a label transmission section 103D, a determination section 103E, and a packet transfer section 103F.

Of the above components, the inquiry section 103A has a function of transferring the acquisition request sent from the terminal device 104 to the DNS server 105, and acquiring a transmission destination terminal address and a transmission destination label corresponding to the transmission destination terminal from the DNS server 105. The label creation section 103B has a function of creating a unique relay label, and the label storage section 103C has a function of relating the relay label, which is created by the label creation section 103B, to the transmission destination terminal address and transmission destination label acquired by the inquiry section 103A, and stored thus obtained label.

Further, the label transmission section 103D has a function of transmitting the relay label and the private address of the relay unit (relay unit 103) to the terminal device 104. The determination section 103E has a function of, if a packet containing the relay label transmitted from the label transmission section 103D is received from the terminal device 104, determining that the transmission destination terminal address and transmission destination label, which are related to the relay label and stored by the label storage section 103C, are an address and a label related to a transmission destination or a relay destination of the packet. Moreover, the packet transfer section 103F has a function transferring the received packet to the transmission destination or relay destination by using the address and label of the transmission destination or relay destination, which are determined by the determination section 103E, as information of the transmission destination, and by using the relay label and the global address of the relay unit as information of the transmission source.

Figure 7:
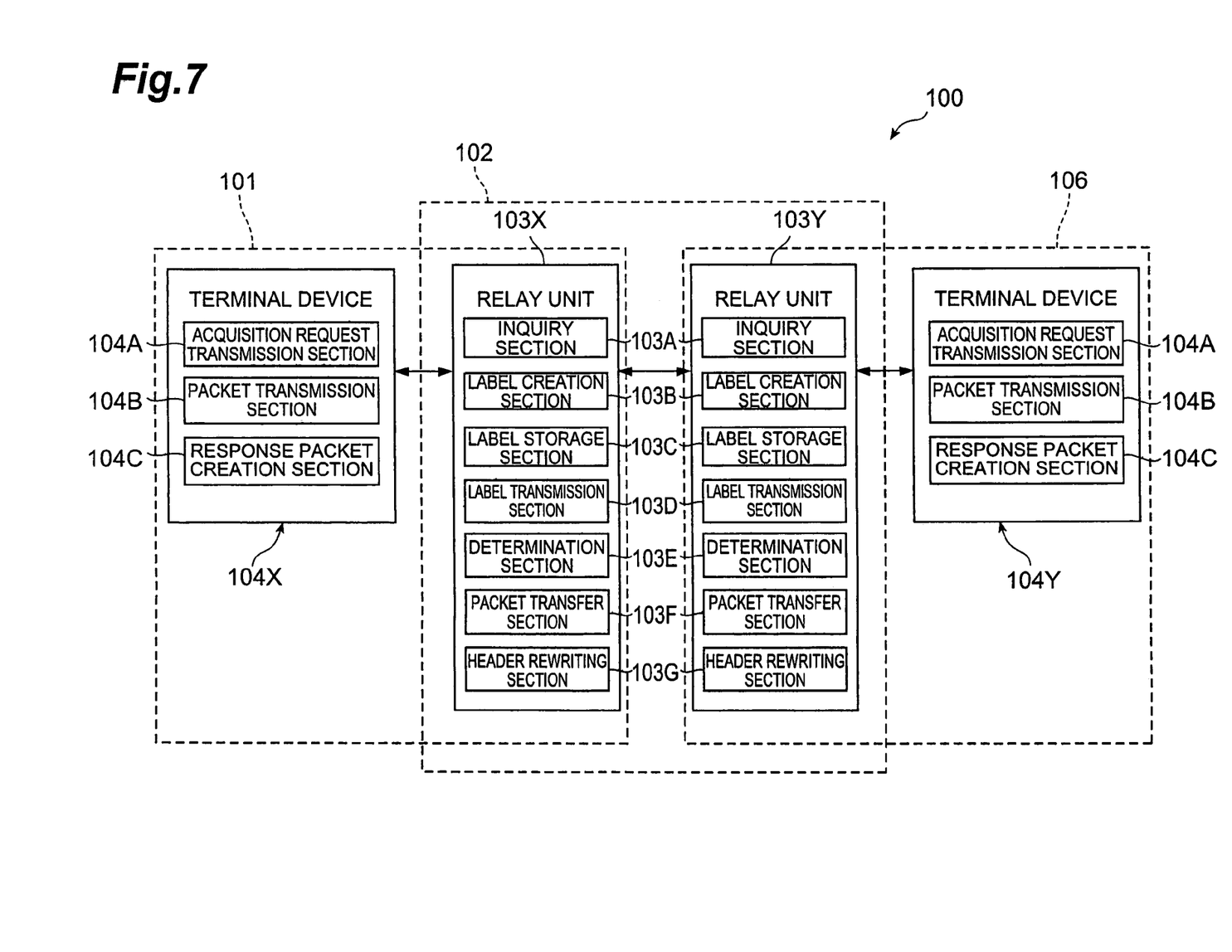
FIG. 7 is a functional block diagram showing another configuration of the communication system.

Next, a configuration of the communication system 100 in which one or more address space lie between the address space of the transmission source terminal and the address space of the transmission destination terminal is shown in FIG. 7. As shown in FIG. 7, in the communication system 100 the global address space 102 lies between the private address space 101 to which a transmission source terminal device 104X belongs and a private address space 106 to which a transmission destination terminal device 104Y belongs. Here, the terminal devices 104X and 104Y comprise a response packet creation section 104C in addition to the configuration shown in FIG. 1. Once receiving a packet for its terminal (i.e. a packet in which the address of the relay unit is set as a transmission destination address, and which has a packet header contain therein the transmission destination address, a transmission destination label, a transmission source address, and a transmission source label) from the relay unit, the response packet creation section 104C switches between the transmission destination address and the transmission source address, and switches between the transmission destination label and the transmission source label, thereby creating a response packet. The packet transmission section 104B returns the created response packet to the relay unit.

Furthermore, a relay unit 103X, 103Y has a header rewriting section 103G in addition to the configuration shown in FIG. 1. The header rewriting section 103G acquires an address and label corresponding to, among the relay labels stored in the label storage section 103C, a relay label matching the transmission destination label of the received response packet, sets the acquired address and label as the transmission destination address and the transmission destination label, and sets the address of the relay unit and the transmission destination label of the response packet as the transmission source address and the transmission source label, thereby rewriting the packet header of the response packet.

By the configuration mentioned above, the response packet is created in the transmission destination terminal, and, by rewriting the header of the response packet in the relay unit, the response packet is caused to pass, in the opposite direction, through a route where the response packet is transmitted from the transmission source terminal to the transmission destination terminal, and returned to the transmission source terminal. Specifically, a response packet is created to easily perform an operation of transferring it to the transmission source terminal, and a TCP communication can be realized.

Incidentally, when transferring the packet from the terminal device 104X to the terminal device 104Y in the configuration shown in FIG. 7, the relay units 103X and 103Y is involved, but the relay unit 103Y needs to rewrite the packet header of the packet transferred from the relay unit 103X. Therefore, the label creation section 103B, label storage section 103C, and header rewriting section 103G of each relay unit 103 have the following functions. Specifically, when a packet is transferred from other relay unit, the label creation section 103B creates a unique relay label dynamically, the label storage section 103C relates the created relay label to the transmission source address and transmission source label of the received packet and stores the packet, the header rewriting section 103G acquires an address and label corresponding to a relay label matching the transmission destination label of the received packet among the relay labels already stored in the label storage section 103C, sets the acquired address and label as the transmission destination address and the transmission destination label, and sets the address of the relay unit and the created relay label as the transmission source address and the transmission source label, thereby rewriting the packet header of the received packet.

[Description of Various Communication Patterns]

Next, as the communication patterns related to the present embodiment, four patterns are described sequentially: (1) label registration processing; (2) label acquisition processing; (3) a first relay pattern in which a communication between two adjacent address spaces is relayed by the relay unit; and (4) a second relay pattern in which a communication between two private address spaces between which are provided a plurality of global address spaces is relayed by a plurality of relay units.

[(1) Label Registration Processing]

Figure 3:
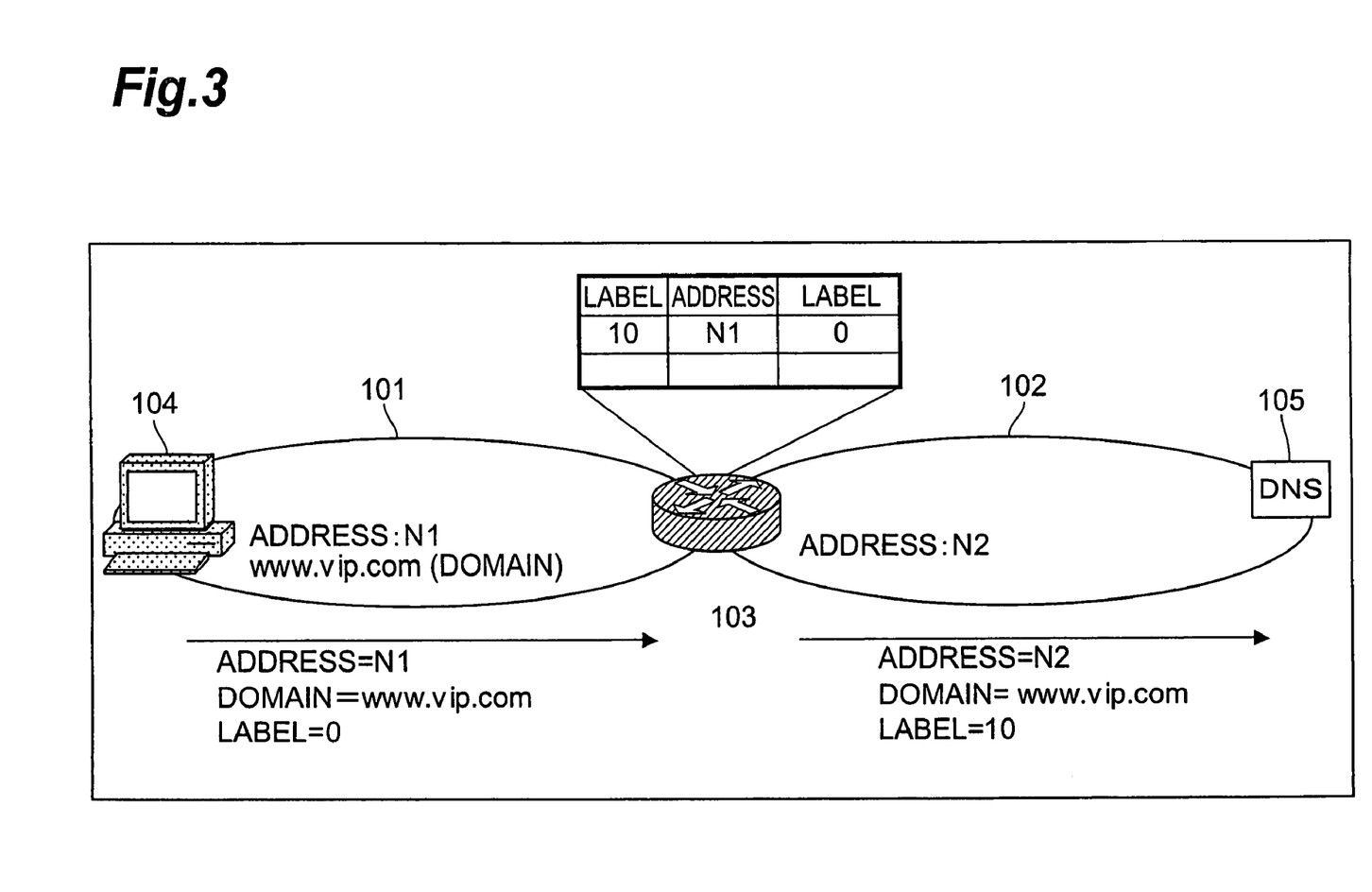
FIG. 3 is a figure for explaining a method of registering a label according to an embodiment.

FIG. 3 is a figure for explaining the label registration processing. The configuration of a communication system here is same as the one shown in FIG. 1, and the private address of the terminal device 104 is N1, and the global address of the relay unit 103 is N2.

The terminal device 104 transmits a registration request containing the private address N1, a domain, and a 0th label, which is described hereinafter, to the relay unit 103. It should be noted that "0th label" means a label indicating that the relay unit is not passed through in subsequent relay routes.

Once receiving the registration request from the terminal device 104, the relay unit 103 creates a label (a label 10 in this example) dynamically, and, as shown in FIG. 3, relates the created label 10 to the private address N1 and 0th label obtained from the registration request, and thereafter keeps thus obtained label in a table. The relay unit 103 further transmits the registration request containing the global address N2, domain, and created label 10 to the DNS 105, thereby carrying out registration request.

[(2) Label Acquisition Processing]

Figure 4:
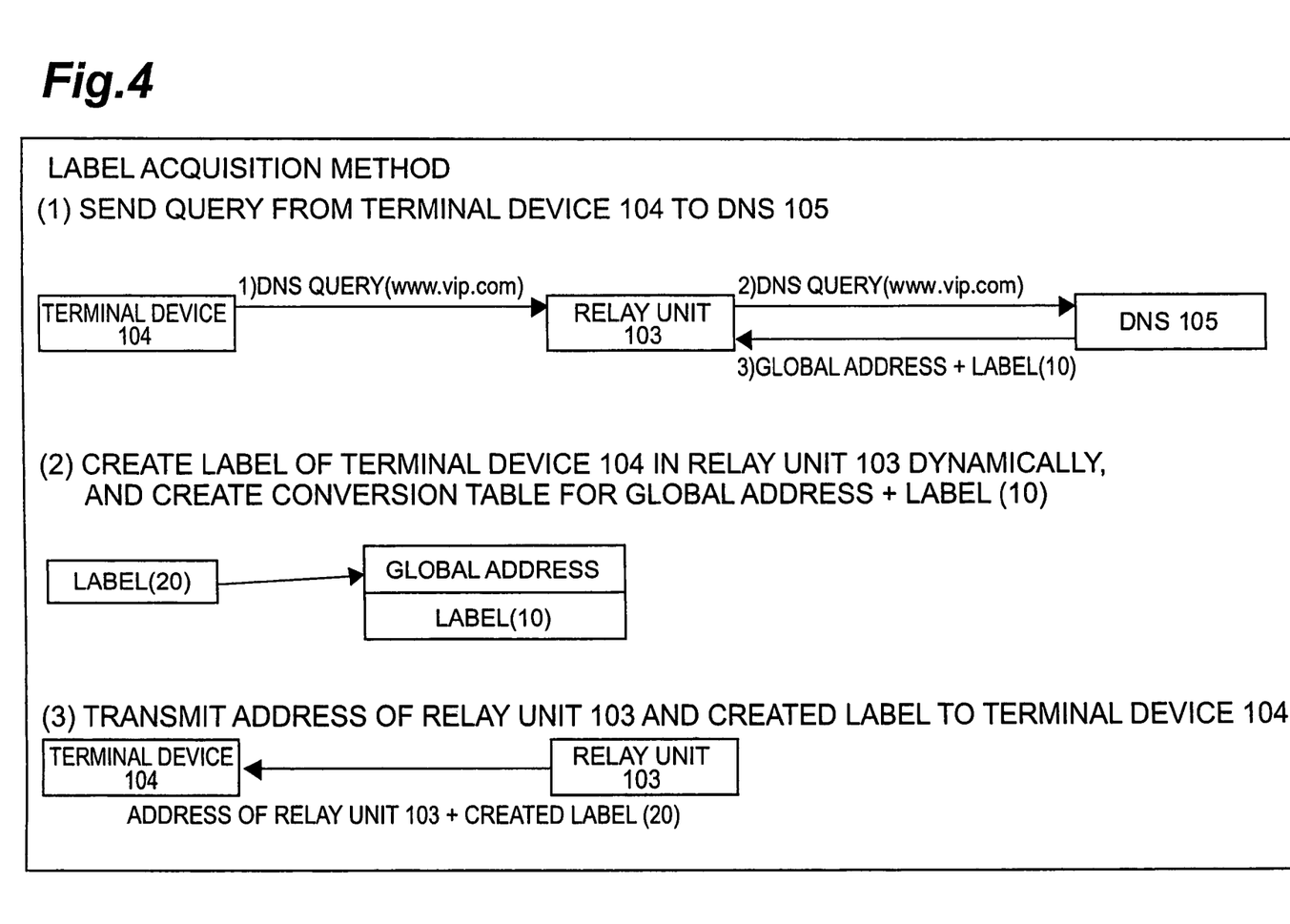
FIG. 4 is a figure for explaining a method of acquiring a label according to an embodiment.

FIG. 4 is a figure for explaining the label acquisition processing. The configuration of the communication system here is the same as in (1) label registration processing shown in FIG. 3.

Once receiving an "acquisition request containing the domain of a communication target terminal" from the terminal device 104, the relay unit 103 transfers the acquisition request to the DNS 105, and acquires a global address and label (a label 10 in this example) from the DNS 105.

Next, the relay 103 creates a new label (a label 20 in this example), and, as shown in FIG. 4, relates the created label 20 to the acquired global address and label 10, and thereafter keeps thus obtained label in the table.

The relay unit 103 then transmits the private address of the relay unit 103 and the created label 20 to the terminal device 104.

[(3) First Relay Pattern]

Figure 5:
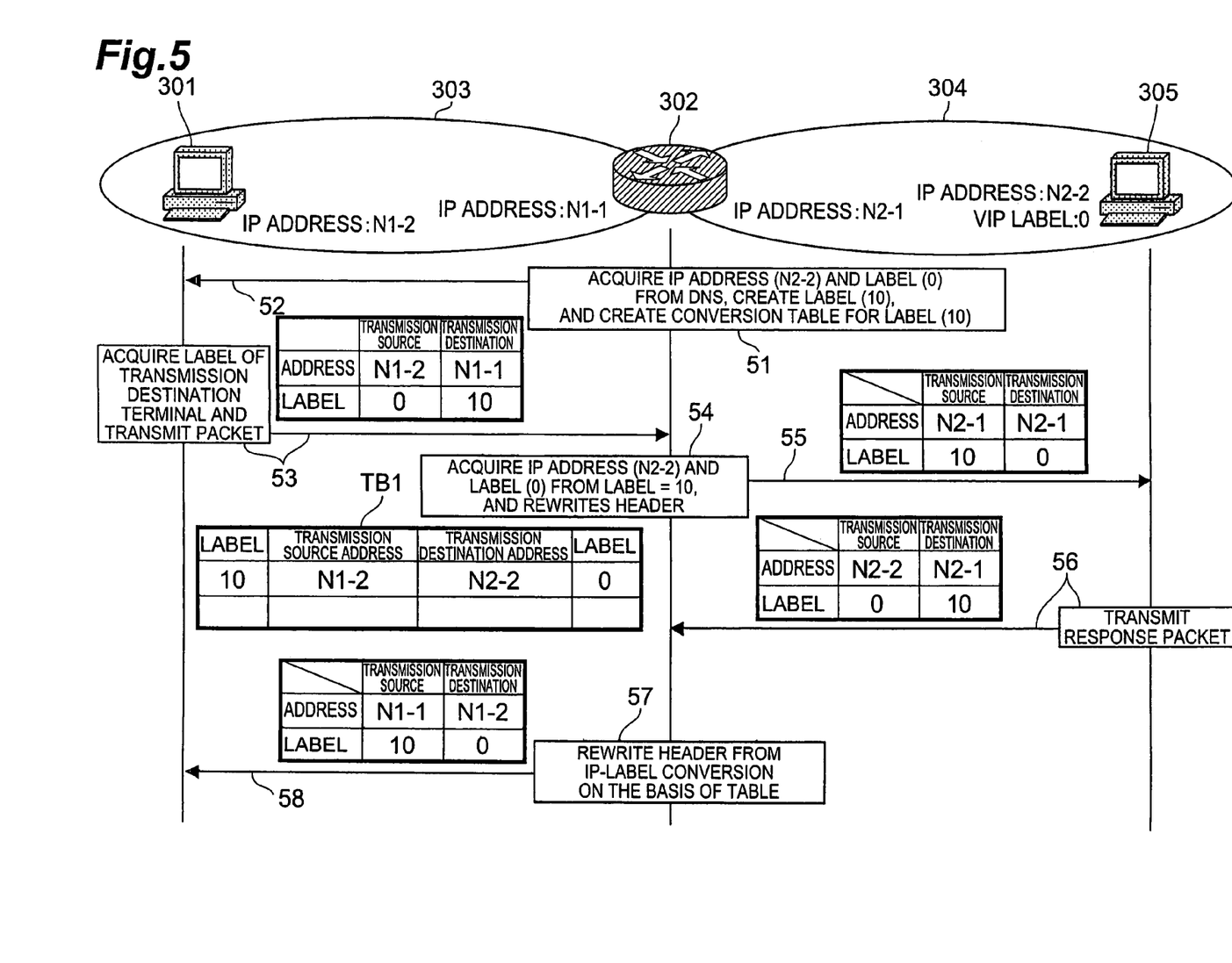
FIG. 5 is a figure for explaining a first relay pattern.

Next, the first relay pattern in which a communication between two adjacent address spaces is relayed by the relay unit is described on the basis for FIG. 5.

FIG. 5 shows how a transmission source address, transmission destination address, transmission source label, and transmission destination label of a packet transit in a state in which a communication is carried out between two address spaces using the relay unit. In the figure, 301 and 305 are terminal devices, 302 is a relay unit, 303 is a private address space, 304 is a global address space. The terminal device 301 is a transmission source terminal device in the first relay pattern, belongs to the private space, and has a private address N1-2. The terminal device 305 is a transmission destination terminal device in the first relay pattern, belongs to the global space, and has a global address N2-2. Furthermore, the relay unit 302 has N1-1 as an address on the private space side, and has N2-1 as an address on the global space side.

First of all, after acquiring the address N2-2 and the 0th label (label 0) from the DNS, the relay unit 302 creates a unique label (a label 10 in this example) dynamically, relates the created label 10 to the address N2-2 and label 0, keeps thus obtained label in a conversion table TB1 (process 51 in FIG. 5). The relay unit 302 transmits the label 10 and the N1-1, which is "the address on the transmission source terminal device side," of the relay unit 302 to the transmission source terminal device 301 (process 52).

Next, the transmission source terminal device 301 sets the transmission source address to the private address N1-2 of the relay unit, the transmission source label to 0th label (label 0), the transmission destination address to the private address N1-1 of the relay unit 302, and the transmission destination label to the label 10 received from the relay unit 302, and then transmits a packet, which is a target of transmission, to the relay unit 302 (process 53).

Once receiving the packet, the relay unit 302 acquires the address N2-2 and the label 0 corresponding to the transmission label (label 10) of the packet received from the transmission source terminal device 301 in the conversion table TB1, and sets the transmission destination address in the packet header to the address N2-2, the transmission destination label to label 0, the transmission source address to N2-1 which "the address for transmission existing on the address space side" of the relay unit 302, and the transmission source label to the transmission destination label (label 10) of the received packet (i.e. rewrites the packet header) (process 54). The relay unit 302 then transmits the packet in which the packet header has been rewritten to the global address space 304 (process 55). In the transmitted packet, the transmission destination address is set to the address N2-2, thus this packet is sent to the transmission destination terminal device 305.

Once receiving the packet, the transmission destination terminal device 305 switches between the transmission destination address "N2-2" and the transmission source address "N2-1" of the packet header, switches between the transmission destination label "label 0" and the transmission source label "label 10" to create a response packet, and transmits the created response packet to the relay unit 302 (process 56).

Once receiving the response packet, the relay unit 302 acquires the address N1-2 and label 0 corresponding to the transmission destination label (label 10) in the conversion table TB1, sets the transmission destination address in the packet header to address N1-2, the transmission destination label to label 0, the transmission source address to N1-1, which is "the address for transmission existing in the address space side," of the relay unit 302, and the transmission source label to the transmission destination label (label 10) of the received packet (i.e. rewrites the packet header) (process 57). Then the relay unit 302 transmits the response packet in which the packet header has been rewritten to the private address space 303 (process 58). In the transmitted response packet, the transmission destination address is set to the address N1-2, thus the response packet is sent to the transmission source terminal device 301.

[(4) Second Relay Pattern]

Figure 6:
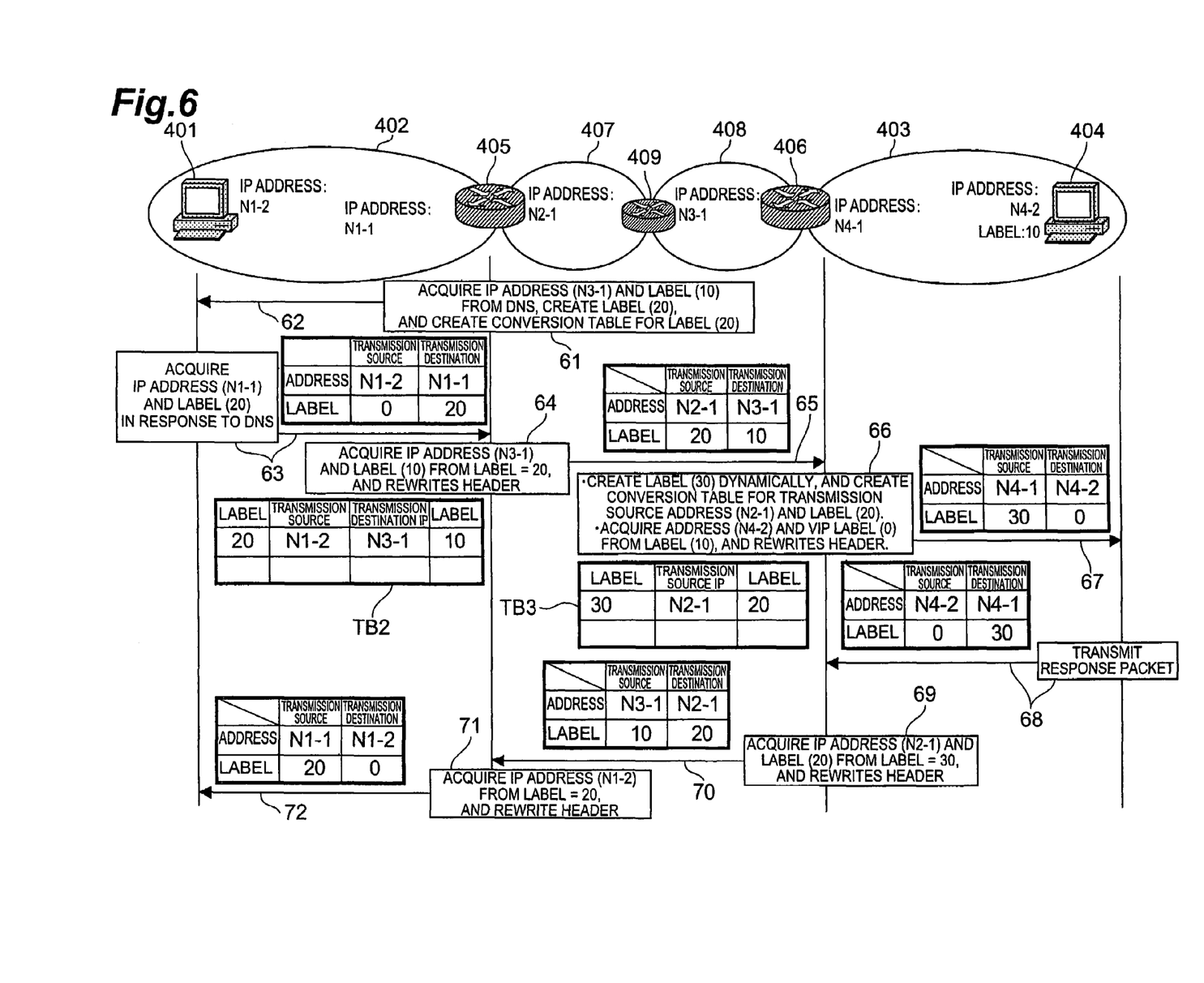
FIG. 6 is a figure for explaining a second relay pattern.

Next, the second relay pattern in which a communication between two private address spaces between which are provided a plurality of global address spaces is relayed by a plurality of relay units is described on the basis of FIG. 6.

FIG. 6 shows how a transmission source address, transmission destination address, transmission source label, and transmission destination label of a packet transit in a state in which a plurality of global address spaces are provided between two private address spaces. A transmission source terminal device 401 belongs to a private address space 402, and a transmission destination terminal device 404 belongs to a private address space 403. The two private address spaces 402 and 403 are connected to each other by means of relay units 405 and 406 to which the present invention is applied, global address spaces 407 and 408, and a conventional type of relay unit 409. The terminal device 401 has the private address N1-2, the terminal device 404 has a private address N4-2, the relay unit 405 has the private address N1-1 and the global address N2-1, and the relay unit 406 has a private address N4-1 and a global address N3-1.

First of all, after acquiring the address N3-1 and the label 10 from the DNS, the relay unit 405 creates a unique label (a label 20 in this example) dynamically, relates the created label 20 to the address N3-1 and label 10, and thereafter keeps thus obtained label in a conversion table TB2 shown in FIG. 6 (process 61 in FIG. 6). The relay unit 405 transmits the created label 20 and N1-1, which is "the address of the transmission source terminal device side," of the relay unit 405 to the transmission source terminal device 401 (process 62).

Next, the transmission source terminal device 401 sets the transmission source address to the private address N1-2 of the relay unit, the transmission source label to 0th label (label 0), the transmission destination address to the private address N1-1 of the relay unit 405, and the transmission destination label to the label 20 received from the relay unit 405, and then transmits the packet, which is a target of transfer, to the relay unit 405 (process 63).

Next, once receiving the packet, the relay unit 405 acquires the address N3-1 and label 10 corresponding to the transmission sion destination label (label 20) of the packet received from the transmission source terminal device 401 in the conversion table TB 2, and sets the transmission destination address in the packet header to the address N3-1, the transmission destination label to label 10, the transmission source address to N2-1, which is "the address for transmission existing in the address space side," of the relay unit 405, and the transmission source label to the transmission destination label (label 20) of the received packet (i.e. rewrites the packet header) (process 64). The relay unit 405 then transmits the packet in which the packet header has been rewritten to the global address space 407 (process 65). The transmitted packet is received by the regular relay unit 409, and the regular relay unit 409 transfers the packet to the global address space 408 by means of a conventional method. In the transferred packet, the transmission destination address is set to the address N3-1, thus the packet is sent to the relay unit 406.

Once receiving the packet, the relay unit 406 creates a unique label (a label 30 in this example) dynamically, relates the created label 30 to the transmission source address (N2-1) and the transmission source label (label 20) of the received packet, and keeps thus obtained label in a conversion table TB3 shown in FIG. 6 (preliminary stage of a process 66). Further, the relay unit 406 acquires the address N4-2 which is an address corresponding to the label 10 at the time of registration (i.e. the address of the transmission destination terminal device 404) from the table which is created when registering the transmission destination terminal device 404 to the DNS, and sets the transmission destination address in the packet header to the address N4-2, the transmission destination label to label 0, the transmission source address to N4-1, which is "the address for transmission existing in the address space side," of the relay unit 406, and the transmission source label to the created label (label 30) (i.e. rewrites the packet header) (subsequent stage of the process 66). The relay unit 406 then transmits the packet in which the packet header has been rewritten to the private address space 403 (process 67).

Once receiving the packet, the transmission destination terminal device 404 switches between the transmission destination address "N4-2" and the transmission source address "N4-1" in the packet header, and switches the transmission destination label "label 0" and the transmission source label "label 30" to create a response packet, and transmits the created packet to the relay unit 406 (process 68).

Once receiving the response packet, the relay unit 406 acquires the address N2-1 and label 20 corresponding to the transmission destination label (label 30) of the response packet in the conversion table TB3, and sets the transmission destination address in the packet header to the address N2-1, the transmission destination label to label 20, the transmission source address to N3-1, which is "the address for transmission existing in the address space side," of the relay unit 406, and the transmission source label to the label 10 at the time of DNS registration, which is related to the transmission destination terminal device 404 (i.e. rewrites the packet header) (process 69). The relay unit 406 then transmits the response packet in which the packet header has been rewritten to the global address space 408 (process 70). The transmitted response packet is received by the regular relay unit 409, and the regular relay unit 409 transfers the response packet to the global address space 407 by means of the conventional method. In the transferred response packet, the transmission destination address is set to the address N2-1, thus this response packet is sent to the relay unit 405.

Once receiving the response packet, the relay unit 405 acquires the address N1-2 corresponding to the transmission destination label (label 20) of the response packet in the conversion table TB2, sets the transmission destination address in the packet header to the address N1-2, the transmission destination label to 0th label (label 0), the transmission source address to N1-1, which is "the address for transmission existing in the address space side," of the relay unit 405, and the transmission source label to the transmission destination label of the received packet (label 20) (i.e. rewrites the packet header) (process 71). The relay unit 405 then transmits the response packet in which the packet header is rewritten to the private address space 402 (process 72). In the transmitted response packet, the transmission destination address is set to the address N1-2, thus the response packet is sent to the transmission source terminal device 401.

Even when carrying out communication between the different address spaces as described in the first relay pattern in which a communication between two adjacent address spaces is relayed by the relay unit, and the second relay pattern in which a communication between two private address spaces between which are provided a plurality of global address spaces is relayed by a plurality of relay units, the load in address conversion can be avoided by using the labels, and the packet communication can be smoothly carried out between the different address spaces.

Moreover, regarding the communication between two adjacent address spaces, the present invention can be applied to a communication between private address spaces, a communication between global address spaces, and a communication between a private address space and a global address space, and still the same effects can be obtained. Further, regarding the communication between two address spaces between which a plurality of address spaces are provided, any of the address space on the transmission source side, the address space on the transmission destination side, and the plurality of mediating address spaces may be the private address space or global address space, and still the same effects can be obtained by applying the present invention.

The disclosure of Japanese Patent Application No. 2005-033382 filed Feb. 9, 2005 including specification, drawings and claims is incorporated herein by reference in its entirety.

What is claimed is:

1. A relay unit capable of inquiring of a name resolution system, the relay unit comprising:

an inquiry section which transfers a received acquisition request, which is sent from a transmission source terminal belonging to a certain address space and is related to a transmission destination terminal address belonging to an address space different from the certain address space, to the name resolution system, and acquires, in response to the transferred acquisition request, the transmission destination terminal address and a transmission destination label corresponding to the transmission destination terminal from the name resolution system;

a label creation section which creates a unique relay label;

a label storage section which correlates the unique relay label with the transmission destination terminal address and the transmission destination label acquired by the inquiry section, to produce a stored label;

a label transmission section which transmits the unique relay label and an address of the relay unit to the transmission source terminal;

a determination section which, if a packet containing the unique relay label transmitted from the label transmission section is received from the transmission source terminal, determines that the transmission destination terminal address and the transmission destination label, which are caused to correlate with the stored label produced by the label storage section, are an address and a label related to a transmission destination or a relay destination of the packet;

a packet transfer section which transfers the received packet to the transmission destination or the relay destination by using the address and label of the transmission destination or relay destination, which are determined by the determination section, as information of a transmission destination, and by using the unique relay label and the address of the relay unit as information of a transmission source; and a header rewriting section which, when a response packet with a packet header including a transmission destination address, a transmission destination label, a transmission source address, and a transmission source label is received, acquires an address and label corresponding to a relay label matching the transmission destination label among the relay labels stored in the label storage section, sets the acquired address and label as the transmission destination address and the transmission destination label, and sets the address of the relay unit and the transmission destination label of the response packet as the transmission source address and the transmission source label, thereby rewriting the packet header of the response packet.

2. The relay unit according to claim 1, wherein, if a packet with a packet header containing a transmission destination address, a transmission destination label, a transmission source address, and a transmission source label is received from other relay unit, the label creation section creates a unique relay label dynamically, the label storage section correlates the created unique relay label with the transmission source address and transmission source label of the received packet to produce a stored label, the header rewriting section acquires an address and label corresponding to a relay label matching the transmission destination label of the received packet among the relay labels stored in the label storage section, sets the acquired address and label as the transmission destination address and the transmission destination label, and sets the address of the relay unit and the created relay label as the transmission source address and the transmission source label, thereby rewriting the packet header of the received packet.

* * * * *